(12) United States Patent
Nishide et al.

(10) Patent No.: US 7,839,540 B2
(45) Date of Patent: Nov. 23, 2010

(54) IMAGE PROCESSING APPARATUS AND IMAGE PROCESSING METHOD

(75) Inventors: Yasushi Nishide, Ebina (JP); Ryuichi Ishizuka, Ebina (JP); Mari Kodama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1427 days.

(21) Appl. No.: 10/409,157

(22) Filed: Apr. 9, 2003

(65) Prior Publication Data
US 2004/0080765 A1  Apr. 29, 2004

(30) Foreign Application Priority Data
Oct. 28, 2002 (JP) ............................. 2002-313287

(51) Int. Cl.
*H04N 1/387* (2006.01)
(52) U.S. Cl. ............ 358/450; 358/1.9; 358/2.1; 358/504; 358/518; 382/167
(58) Field of Classification Search ............ 358/1.9, 358/1.13, 1.15, 2.1, 450, 504, 518; 345/589; 347/15, 43; 382/162, 167
See application file for complete search history.

(56) References Cited

U.S. PATENT DOCUMENTS 6,252,676 B1 * 6/2001 Azima et al. ............... 358/1.9
6,594,034 B1 * 7/2003 Bloomquist et al. ........ 358/1.18
6,943,915 B1 * 9/2005 Teraue ....................... 358/1.9
6,970,175 B2 * 11/2005 Hawksworth ............... 345/589
7,375,857 B1 * 5/2008 Pinard et al. ............... 358/3.21
2003/0095271 A1 * 5/2003 Falk ........................... 358/1.9

FOREIGN PATENT DOCUMENTS

| JP | 2000-246874 A | 9/2000 |
|---|---|---|
| JP | A 2002-292817 | 10/2002 |
| JP | A 2002-297360 | 10/2002 |
| JP | A 2002-300414 | 10/2002 |

OTHER PUBLICATIONS

Japanese Office Action mailed Nov. 17, 2009 with English language translation.

* cited by examiner

*Primary Examiner*—Edward L Coles
*Assistant Examiner*—Vu B Hang
(74) *Attorney, Agent, or Firm*—Oliff & Berridge, PLC (57) ABSTRACT

In a print server, when page setting is made, a spot color name is extracted from a comment in an image drawing command and image data or a code of a job on a page (page layout) unit basis and a list for a spot color name of each page is generated. After that, a color separating process and an RIP are performed on the page unit basis, raster data of each of colors C, M, Y, and K and corresponding raster data of a spot color name is generated, after that, on the basis of CMYK values designated by the spot color name, the raster data of the spot color is composed with the raster data of each of the colors C, M, Y, and K, and the resultant is output. In such a manner, an overprint of an object designated in a spot color can be reproduced accurately.

12 Claims, 8 Drawing Sheets

IMAGE PROCESSING APPARATUS AND IMAGE PROCESSING METHOD

BACKGROUND OF THE INVENTION

1. Field of the Invention

The present invention relates to an image processing apparatus and image processing method for image processing an image such that a printout apparatus prints out the image corresponding to image data generated by various applications. More particularly, the invention relates to an image processing apparatus and method for image processing image data for printing, such that a printout apparatus prints the image data using a printing plate.

2. Description of the Related Art

As digitization in the field of a printing process, DTP (Desktop Publishing) is penetrating. In the DTP, a page layout is generated by generating, processing and/or editing an image by using various applications on a processing device such as a personal computer or workstation. A film used for exposing a printing plate is generated on the basis of the page layout (image setter or RIP for plate), or a printing plate is generated by writing data directly to a printing plate (CTP: Computer to Plate).

In the operation, an image of a page layout is separated into colors of C, M, Y, and K and a printing plate is exposed on the basis of image data of each color, thereby generating a press plate obtained by forming a halftone image on the printing plate. Ink of a predetermined color is applied to the press plate of each color, and overlapping printing is performed, thereby forming a color image on a printing matter.

When a plate misalignment occurs in the printing process using a press plate, there are cases that color shift occurs in a border or the like of an image. To prevent deterioration in quality caused by the plate misalignment, overprinting and trapping process is performed. In the printing process using press plates, to overprint images of color components, the overprinting and trapping process is performed, thereby enabling an image to be properly reproduced.

In practice, prior to printing using press plates, a proof is made. A page layout is displayed on a monitor or an image is printed by a printout apparatus such as a laser printer or page printer by using the WYSIWYG function.

At the time of checking the overprinting and trapping process by using a printout apparatus, an image drawing command of performing a color separating process for generating images of color components of C, M, Y, and K like has to be executed by an image processing apparatus having a special function.

In the case of performing color separation output, however, pages of the number of plates have to be transferred, so that the data size becomes at least four times as large as that of normal composite output. When a spot color is included, there is the possibility that the data size further increases. Consequently, data transfer time and processing time become longer.

On the other hand, various efficient methods used when a trouble occurs in color separation output have been proposed (refer to, for example, Japanese Patent Application Laid-open (JP-A) Nos. 2002-292817, 2002-297360, and 2002-300414). Those proposals however are not related to a method of easily improving transfer time and processing time.

The occasions of using PDF are increasing. However, special software for performing color separation output for the PDF is necessary. To check overprint or trapping in color separation output, a work which is complicated a little is required.

At the time of conducting proof by using a printer, there are cases such that overprint or trapping is reproduced in a composite output using an image drawing command of performing normal color printing without executing a color separation process.

In this case, by using a technique called "In-RIP separation" of performing color separation process for an image drawing command corresponding to a composite output on the side of the RIP (printer), an image subjected to the overprinting and trapping process can be reproduced. Hitherto, overprinting and trapping is reproduced in a composite output by using such a technique.

In the field of printing, in addition to the colors of C, M, Y, and K, there is a case that a so-called spot color different from the C, M, Y, and K colors is used. Although an image of a spot color can be reproduced by the In-RIP separation, a spot color has to be set prior to image processing for printing.

For a composite output, however, a process of setting a spot color prior to the image processing is not included. Consequently, even if In-RIP separation is used and a spot color is designated for an image (object) the image is processed as an object expressed in CMYK, so that overprint of the spot color cannot be reproduced accurately.

Figure 8:
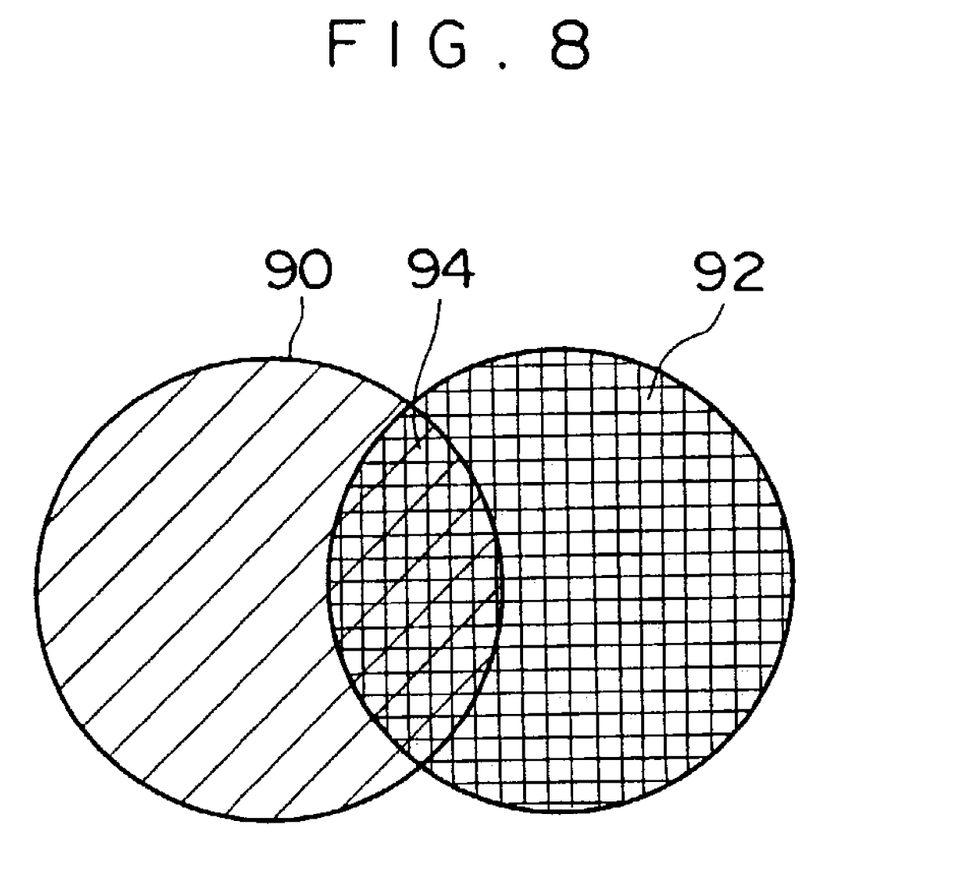
FIG. 8 is a schematic diagram showing an example of an object to be overprinted.

Therefore, for example, as shown in FIG. 8, when an object 90 of CMYK of C=80%, M=0%, Y=0%, and K=20% and an object 92 of a spot color of C=10%, M=100%, Y=50%, and K=0% are overlapped in an overprint setting, to simulate a printed matter using press plates, in an overprint portion 94, C=90%, M=100%, Y=50%, and K=20%, so that an adding process has to be performed for the color C.

On a printed matter obtained by using a printer, the spot color cannot be reproduced properly, so that the color C is knocked out, resulting C=10%, M=100%, Y=50%, and K=20%. That is, even when a spot color is set in a composite output, the spot color name cannot be known prior to the image processing, so that it is difficult to separate an image into the spot color.

As described above, even when In-RIP separation is used, if a spot color is designated, an image is processed as an image (object) expressed in CMYK and it causes a problem such that an overprint of an object of a spot color cannot be accurately reproduced.

SUMMARY OF THE INVENTION

The present invention has been achieved in consideration of the facts and its object is to propose an image processing apparatus capable of accurately reproducing an overprint of a spot color on a printed matter output from a printout apparatus.

To this end, a first aspect of the invention provides an image processing apparatus for generating raster data based on image data input together with an image drawing command from an image processing terminal, the image processing apparatus comprising an extracting unit for extracting a spot color name, which is different from colors C, M, Y, and K, from at least one of the image drawing command and the image data, a color separated raster data generating unit for generating raster data of each of the colors C, M, Y, and K and the spot color designated by the spot color name, from said at least one of the image drawing command and the image data, and a composing unit for composing the raster data of the spot color with the raster data of each of the colors C, M, Y, and K, thereby generating raster data of each of the colors C, M, Y, and K based on said at least one of the image drawing command and the image data.

According to the first aspect, when there is an object (image) designated in a spot color name, the extracting unit extracts a spot color name from an image drawing command or image data. The color separated raster data generating unit generates raster data of each of the colors C, M, Y, and K in accordance with the image drawing command or image data. When the extracting unit extracts a spot color name, the color separated raster data generating mean generates raster data according to the spot color name.

Consequently, raster data of each of the colors C, M, Y, and K and raster data of the color corresponding to the spot color name can be generated.

The composing unit composes the raster data of each of the colors C, M, Y, and K with the CMYK values of the spot color.

With the configuration, even when an object designated in a spot color is included, raster data by which the color of the object can be accurately reproduced is obtained. By outputting the raster data obtained in such a manner to a printout apparatus, a printed matter accurately reproducing a spot color is obtained.

A second aspect of the invention provides an image processing apparatus in which the extracting unit extracts the spot color name prior to a process performed by the color separated raster data generating unit and sets the spot color name to be separated.

According to the second aspect, prior to generation of the raster data by the color separated raster data generating unit, the extracting unit extracts a spot color name.

Consequently, based on the spot color name extracted by the extracting unit, raster data according to each of the colors C, M, Y, and K and the spot color name can be smoothly generated by the color separated raster data generating unit.

A third aspect of the invention provides an image processing apparatus further comprising a setting unit for setting a temporary spot color name, and a storing unit for storing the spot color name extracted by the extracting unit so as to be associated with the temporary spot color name, wherein the color separated raster data generating unit separates the spot color as the associated temporary spot color, and the composing unit composes raster data, which has been separated as the associated temporary spot color, as raster data of the spot color with raster data of each of the colors C, M, Y, and K.

According to the third aspect, a temporary spot color name is set in advance. When a spot color name different from each of the colors C, M, Y, and K is designated, the spot color name is stored in the storing unit and the color separated raster data generating unit generates raster data of an object designated in the spot color as a temporary spot color name.

The composing unit replaces the raster data of the temporary spot color name with raster data according to the spot color name and composes the raster data with raster data of each of the colors C, M, Y, and K.

Consequently, extraction of a spot color name can be performed in parallel with a color separating process, so that the processing time can be shortened as compared with the case of extracting a spot color name prior to the color separating process.

In the third aspect as described above, preferably, the setting unit can set the number of colors to be separated by the color separated raster data generating unit, which number of colors varies according to the number of the temporary spot colors.

In the aspect, the composing unit performs color correction on raster data of each of the colors C, M, Y, and K and composes raster data of the spot color with raster data of each of the colors C, M, Y, and K, thereby generating raster data of each of the colors C, M, Y, and K based on said at least one of the image drawing command and the image data.

In the aspect, the composing unit composes C, M, Y, and K values, which are calculated by referring to the raster data of the spot color, and a prestored table with raster data of each of the colors C, M, Y, and K, thereby generating raster data of each of the colors C, M, Y, and K based on said at least one of the image drawing command and the image data.

Further, in the aspect, the image processing terminal includes an adding unit for adding information of the spot color name to the top of said at least one of the image drawing command and the image data, and the extracting unit extracts the spot color name added by the adding unit.

According to another aspect, the present invention provides an image processing method for generating raster data based on image data input together with an image drawing command from an image processing terminal, the method comprising the steps of extracting a spot color name, which is different from colors C, M, Y, and K, from at least one of the image drawing command and the image data, generating raster data of each of the colors C, M, Y, and K and the spot color designated by the spot color name, from said at least one of the image drawing command and the image data, and composing the raster data of the spot color with the raster data of each of the colors C, M, Y, and K, thereby generating raster data of each of the colors C, M, Y, and K based on said at least one of the image drawing command and the image data.

According to a further aspect, the present invention provides an image processing system comprising at least one image processing terminal for performing an image processing and outputting image data and an image drawing command, an image processing apparatus, which is connected to the image processing terminal, for generating raster data based on the image data and the image drawing command input from the image processing terminal and including extracting unit for extracting a spot color name, which is different from colors C, M, Y, and K, from at least one of the image drawing command and the image data, color separated raster data generating unit for generating raster data of each of the colors of C, M, Y, and K and the spot color designated by the spot color name, from said at least one of the image drawing command and the image data, and composing unit for composing the raster data of the spot color with the raster data of each of the colors C, M, Y, and K, thereby generating raster data of each of the colors C, M, Y, and K based on said at least one of the image drawing command and the image data, and at least one image recording apparatus, which is connected to the image processing apparatus, for recording an image to a recording medium on the basis of raster data input from the image processing apparatus.

DETAILED DESCRIPTION OF THE EMBODIMENTS

Embodiments of the present invention will be described hereinbelow with reference to the drawings.

First Embodiment

Figure 1:
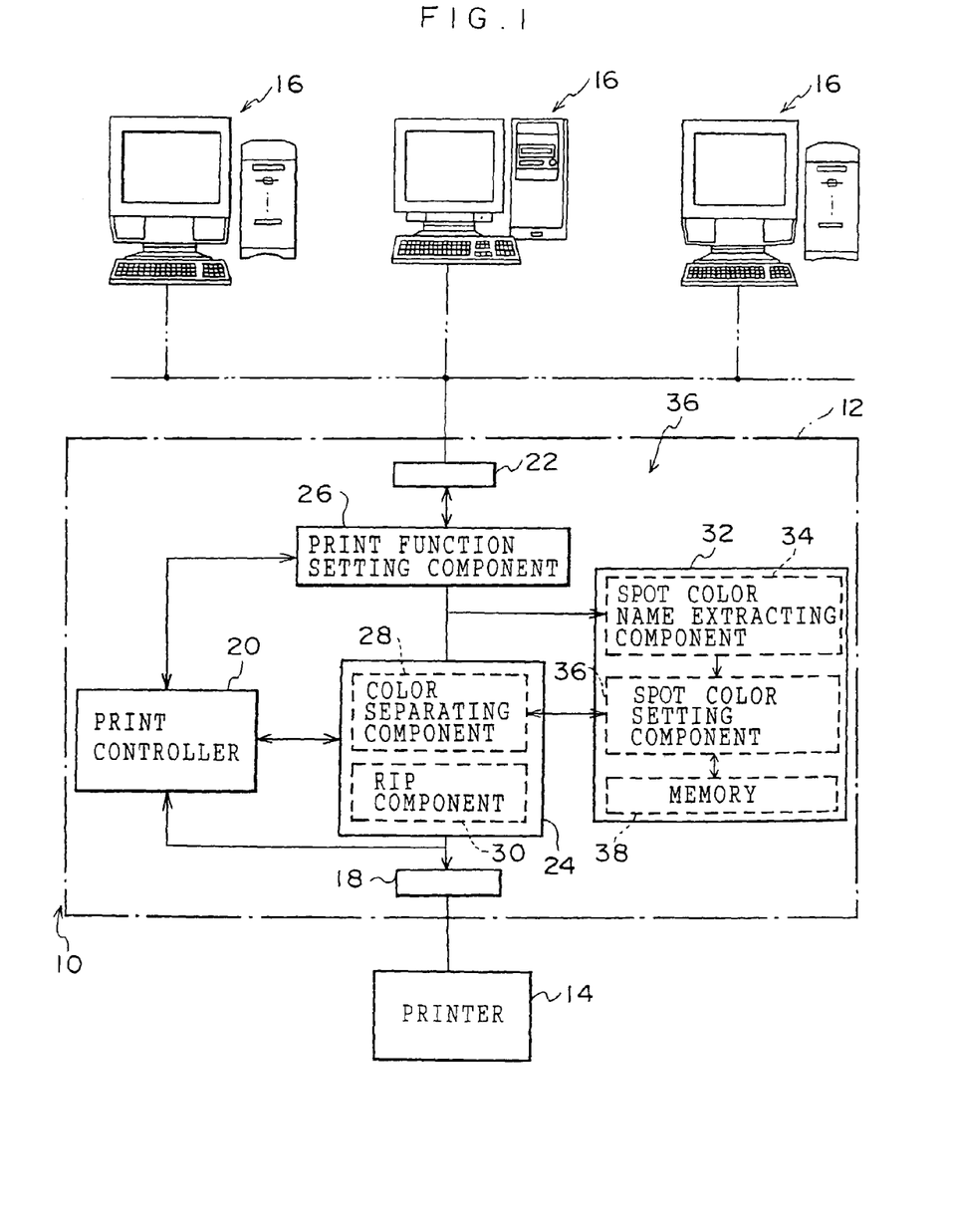
FIG. 1 is a schematic configuration diagram of a print system provided with a print server applied to a first embodiment.

FIG. 1 shows a schematic configuration of a print system 10 applied to a first embodiment.

The print system 10 has an image processing apparatus 12 constructed by, for example, adding a PCI board having a predetermined function to a personal computer (PC) of a general configuration. To the image processing apparatus 12, a printer 14 as a printout apparatus is connected, so that an image processed by the image processing apparatus 12 can be printed.

Further, to the image processing apparatus 12, image processing terminals such as a personal computer and a workstation are connected as client terminals 16. Each of the client terminals 16 can be used for DTP of performing image processes such as generation, processing, editing, and the like of an image by using various applications. The image processing apparatus 12 performs a printing process on the basis of an image drawing command which is input from any of the client terminals 16.

That is, in the print system 10, the image processing apparatus 12 has also the function of a print server (hereinbelow, the image processing apparatus 12 will be called "print server 12"). In the print system 10, a plurality of printers 14 may be connected to the print server 12, or a plurality of client terminals 16 may be connected to the print server 12 via a network such as LAN or WAN.

The print server 12 used in the embodiment is provided with a ROM, a RAM, and an external memory such as an HD. The print server 12 is operated by an operating program stored in the ROM and has a general configuration of executing a process on a system, chart, image, character, table, or the like on the basis of a program stored in the ROM or the external memory.

Such a print server 12 has input devices such as a key board and a mouse (not shown) and a display device such as a CRT display. Also in the print server 12, a printing process on an image displayed on a display device can be performed (WYSIWYG function).

The print server 12 has a bidirectional interface 18 such as Ethernet (R) and a print controller 20. The print controller 20 is connected to the printer 14 via the bidirectional interface 18. In the print server 12, an image processing component 24 and a print function setting component 26 are formed.

The print server 12 is also provided with a network interface 22. Via the network interface 22, an image drawing command is input as a print job together with an image file from the client terminal 16. The print server 12 has a general configuration of performing a printing process based on the image drawing command.

The client terminal 16 performs image processes such as generation, processing, and editing of an image and generates image data of a page layout or the like by using various DTP applications such as Photoshop and Illustrator (trade name of Adobe Systems, Inc., U.S.A.) and QuarkxPress (trade name of Quark, Inc., U.S.A.) (hereinbelow, the image data of the page layout will be described as "page layout").

The page layout generated by the client terminal 16 is used for generation of a film used for exposure of a printing plate in color electronic prepress systems (CEPS) and exposure of a printing plate in Computer To Plate (CTP). By a press plate generated on the basis of the page layout, a printing process is performed.

In DTP, prior to generation of a plate based on a page layout, a proofing operation of generating a printout for proof called a color proof is performed. On the basis of the proof, the page layout is proofed. In the print system 10 applied to the embodiment, the proof can be generated.

At the time of performing the proofing operation, an image file including the page layout is output together with the image drawing command from the client terminal 16 to the print server 12. Thus, the print server 12 performs a printing process based on the page layout.

The page layout input from the client terminal 16 may be in the CMYK system, an RGB system or a system including both the CMYK and RGB systems.

The print function setting component 26 reads settings of the printing functions on the image drawing command of the print job and sets the printing function used at the time of performing the image process and printing process. The settings of the printing function are not limited to settings on the print job. For example, the print server 12 may extract the name of an application which created a print job, and use a preset value corresponding to the extracted application name.

The image processing component 24 in the print server 12 includes a color separating component 28 and an RIP component 30. The separating component 28 divides (separates) a page layout into image data of plate colors of C, M, Y, and K from a print job input from the client terminal 16. The RIP component 30 generates raster data from image data of each color separated. That is, the image processing component 24 generates raster data of the colors Y, M, C, K, and the like from the page layout.

In the print server 12, the raster data is output to the printer 14 while controlling the raster data by the print controller 20, thereby obtaining a printed matter based on the image drawing command or image data input from the client terminal 16.

In the print server 12, a spot color processing component 32 is provided. The spot color processing component 32 has a spot color name extracting component 34, a spot color setting component 36, and a memory 38.

Prior to the image processing in the image processing component 24 on image data input from the client terminal 16, the spot color name extracting component 34 checks whether a spot color which is a color different from C, M, Y, and K has been designated or not in each page layout from the image data. If a spot color is designated, the spot color name is extracted.

The spot color setting component 36 stores the extracted spot color name of each page layout into the memory 38 and outputs the spot color name of the corresponding page when the color separating process on the page layout of each page is performed by the image processing component 24.

On the other hand, in the color separating component 28 provided in the image processing component 24, when the spot color name is input from the spot color processing component 32, image data of the page layout is separated into C, M, Y, and K and, in addition, the spot color (spot color name).

The RIP component 30 can generate raster data of each of the colors C, M, Y, and K and, in addition, raster data of the spot color. By the RIP component 30, raster data of the C, M, Y, K, and the spot color is generated.

Generally, in image data, at the time of setting a spot color, the spot color name and the CMYK values for the spot color are defined. The spot color name extracting component 34 extracts the spot color name and the CMYK values of the spot color. The spot color setting component 36 stores the spot color name and the CMYK values of the spot color into the memory 38. In accordance with processing timings in the image processing component 24, the spot color setting component 36 outputs the spot color name and the CMYK values of the spot color stored in the memory 38 to the image processing component 24.

The image processing component 24 generates raster data of each of the colors C, M, Y, and K and raster data of the spot color, composes the raster data of the spot color with the raster data of each of the colors C, M, Y, and K in accordance with the CMYK values and outputs the resultant as raster data of each of the colors C, M, Y, and K to the printer 14.

The image processing component 24 has a not-shown color management system (hereinbelow, called "CMS") having a general configuration of performing color correction on the raster data of each color. In the image processing component 24, a lookup table (hereinbelow, abbreviated as LUT) used by the CMS for color correction is stored in a not-shown memory such as a hard disk. Consequently, in the image processing component 24, the CMS performs color correction on raster data of each color while referring to the LUT, thereby realizing proper color reproduction.

A process on a spot color in the print server 12 will be described hereinbelow as an action of the first embodiment.

When an image drawing command or image data of the page layout generated by the client terminal 16 is input as a print job, the print server 12 performs an image processing and a printing processing on the print job.

Figure 2:
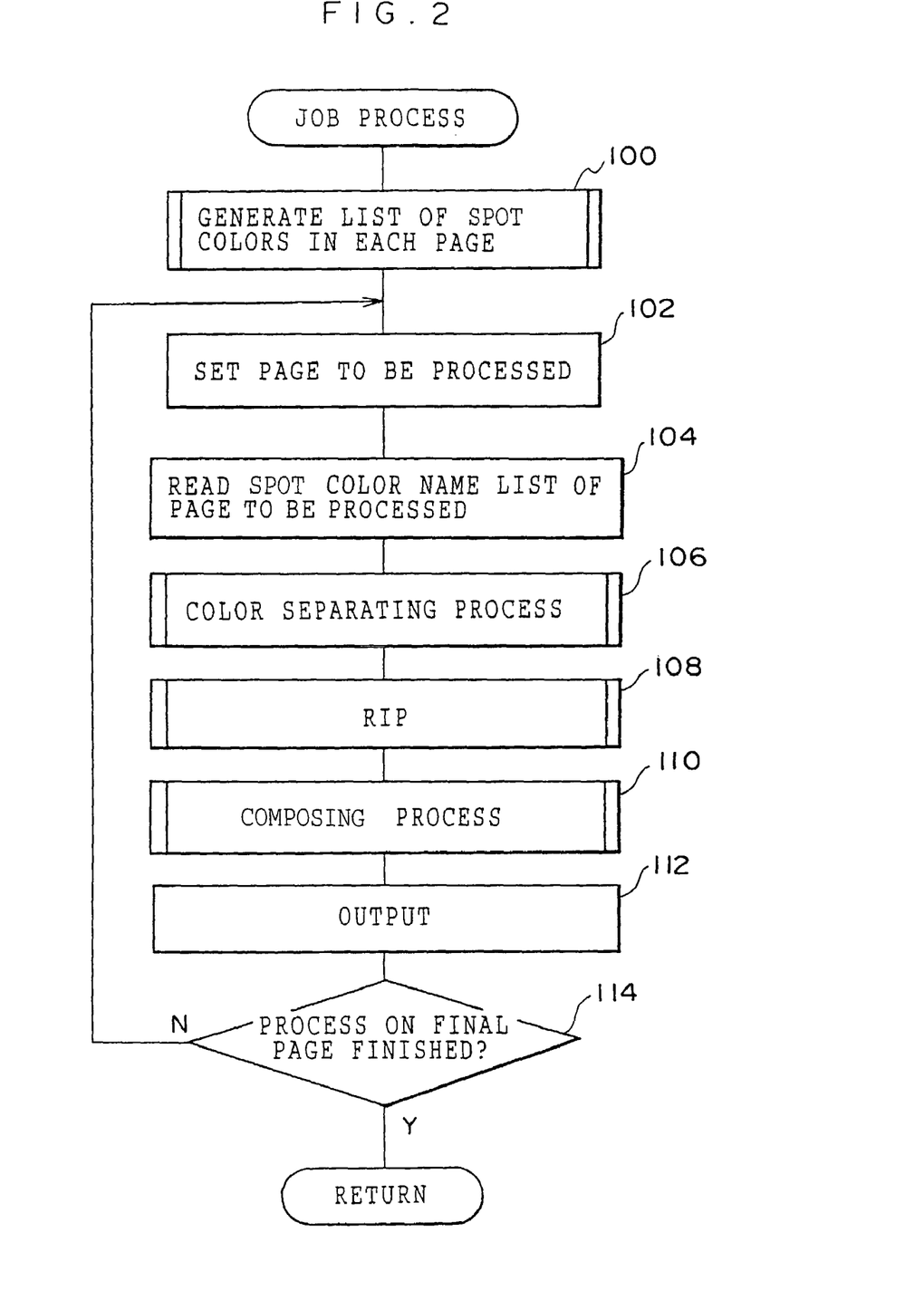
FIG. 2 is a flowchart showing an example of processes according to the first embodiment.

FIG. 2 shows outline of processes in the printer server 12 on the print job. In the flowchart, in the first step 100, a list of spot colors of each page is generated. Specifically, the print server 12 extracts spot color names prior to the image processing on the print job.

Figure 3:
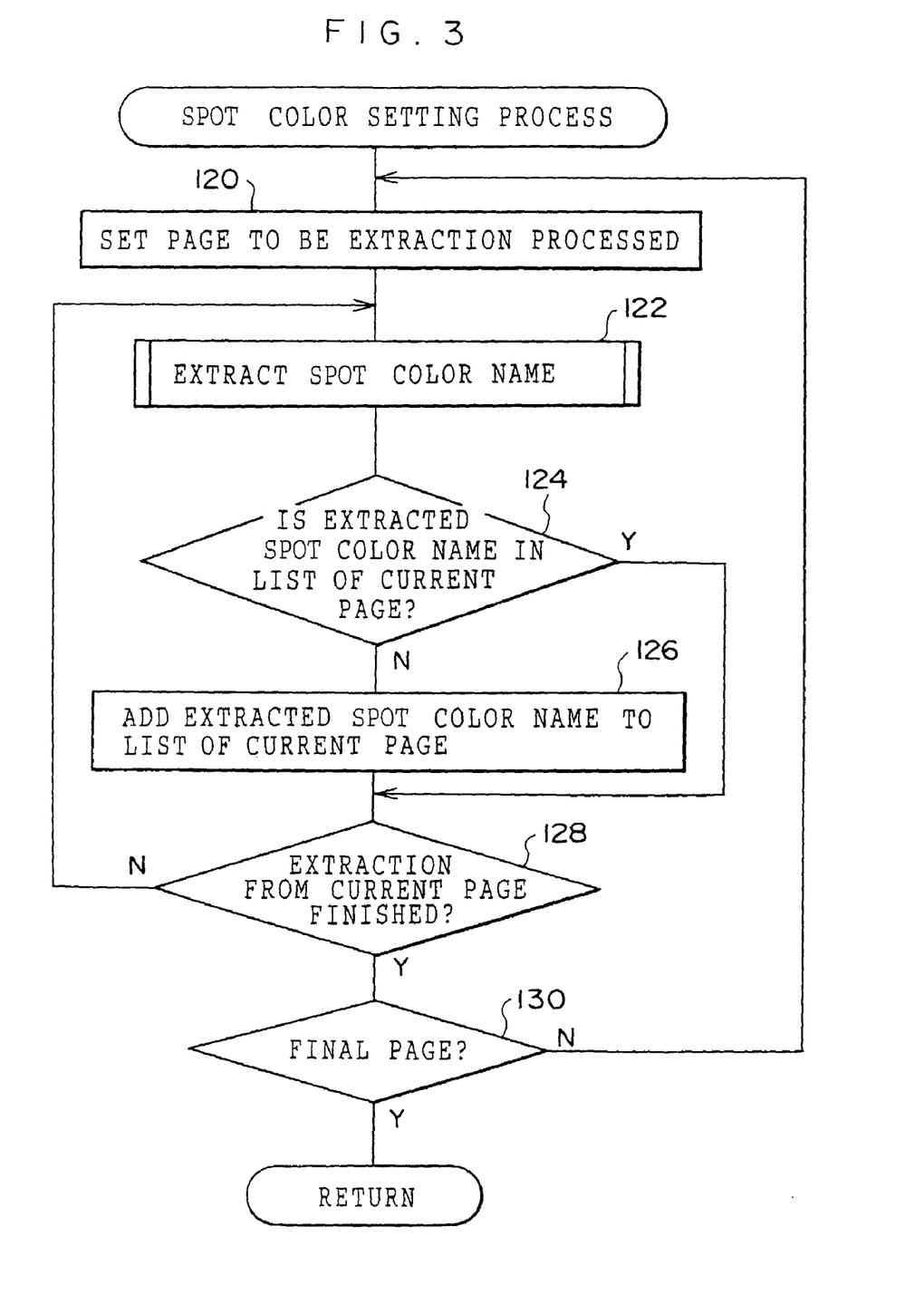
FIG. 3 is a flowchart showing an example of extraction of a spot color name according to the first embodiment.

FIG. 3 shows outline of a spot color setting process of generating a spot color list. In the flowchart, first, page setting is made in step 120. In the page setting, for example, for a page layout of N pages, pages from which spot colors are to be extracted are set from the first page to the N-th page. After that, in step 122, spot color names are extracted.

In some applications used for generating a page layout, spot color names are described in a comment. As a method of extracting a spot color name, whether a spot color is designated or not is checked and the spot color name is extracted by referring to a comment.

For example, when there is the following comment "%%DocumentcustomColors:
%%+ (SPOT 1)
%%+ (SPOT 2)
%%CMYKCustomColor: 0 0.160004 0.169998 0 (SPOT 1)
%%CMYKCustomColor: 0.330002 0.899994 0.0299988 0 (SPOT 2)"

"(SPOT 1)" and "(SPOT 2)" are used as spot color names (CustomColors). Consequently, "(SPOT1)" and "(SPOT2)" can be extracted as spot color names. CMYK values of "(SPOT1)" and "(SPOT2)" can be extracted from description of "CMYKCustomColor:".

When a comment is not generated, by interpreting all of codes in the print job, a spot color name can be extracted. A spot color in a composite output is designated in the form of, for example, "[0 0.16 0.17 0 (SPOT 1)] setcustomcolor". By using "setcustomcolor" as an argument, a spot color name can be extracted from the array of the argument.

In some applications, a spot color is designated in the form of, for example, "[/Separation (SPOT 1)/DeviceGray ( )] setcolorspace". In this case, it is sufficient to re-define a "setcolorspace" operator and extract a spot color name from a sequence of argument. In "setcolorspace", not only a spot color name but also plates (Cyan, Magenta, Yellow, Black, All, and None) specified in the image drawing command may be designated. In this case, these colors should be excluded to extract spot colors.

In the flowchart of FIG. 3, after the spot color names are extracted, a list of the spot color names for each page is generated (refer to Table 1 below). In step 124, whether the extracted spot color name is in the list of the current page or not is checked. If the extracted spot color name is not in the list of the current page (NO in step 124), the program advances to step 126 where the extracted spot color name is added to the list of the current page.

In step 128, whether extraction of the spot color names of the current page has been finished or not is checked. In step 130, whether extraction of spot color names from all of pages has been finished or not is checked.

If extraction of spot color names from all of pages has not been finished (NO in step 130), the program returns to step 120 where a page from which spot color names are to be extracted is set as the next page, and extraction of spot color names from the page is executed.

When the extraction of the spot color names from all of pages is finished, a list of spot color names on the page unit basis is obtained as shown in Table 1. The print server 12 temporarily stores the list in the memory 38.

TABLE 1

| page | 1 | 2 | ... | N |
|---|---|---|---|---|
| spot color name list | [(SPOT1)(SPOT2)] | [(SPOT2)] | ... | [(SPOT1)] |

After the extraction of spot color names is finished and a list for each page is obtained, the print server 12 executes image processing on the print job. In the image processing, a color separating process is performed on image data (page layout) on a page unit basis, an RIP is performed on image data obtained by the color separating process, and the resultant image data is output to the printer 14.

In the flowchart shown in FIG. 2, spot color names for the page to be processed are read out from the list of spot color names of the page processed is read in step 104, and a color separating process is performed also on the spot color in step 106. Specifically, when a spot color name is designated, image data is separated to the colors of C, M, Y, and K and, in addition, the spot color. When a plurality of spot color names are designated, image data is separated also to each of the spot colors.

After obtaining color separation data of the spot colors, in addition to the colors C, M, Y, and K, RIP is performed on each of the color separation data in step 108.

By the process, raster data of the colors of C, M, Y, and K and raster data of the spot colors (for example, (SPOT 1) and (SPOT 2)) which are set in the spot color list are obtained.

A spot color designated in the form of "[0 0.16 0.17 0 (SPOT 1)] setcustomcolor" has to be changed to the form of "[/Separation (SPOT 1)/DeviceGray ( )] setcolorspace". It can be realized by changing the definition of "setcustomcolor".

After generating raster data, in step 110, the raster data of the spot colors is composed with the raster data of each of the colors C, M, Y, and K on the basis of the CMYK values, thereby generating raster data of each of the colors C, M, Y, and K.

At this time, first, the image processing component 24 performs color correction on the raster data of each of the colors C, M, Y, and K by using the CMS. The image processing component 24 composes the raster data of each spot color name with the raster data of each of the colors C, M, Y, and K by referring to the CMYK values of the spot color names.

After that, in step 112, the raster data is output to the printer 14. In step 114, whether a process of the final page is finished or not is checked. If the process has not reached the final page (NO in step 114), the program returns to step 102 where the next page is set as the page to be processed, and a process on the set page is performed.

Figure 4:
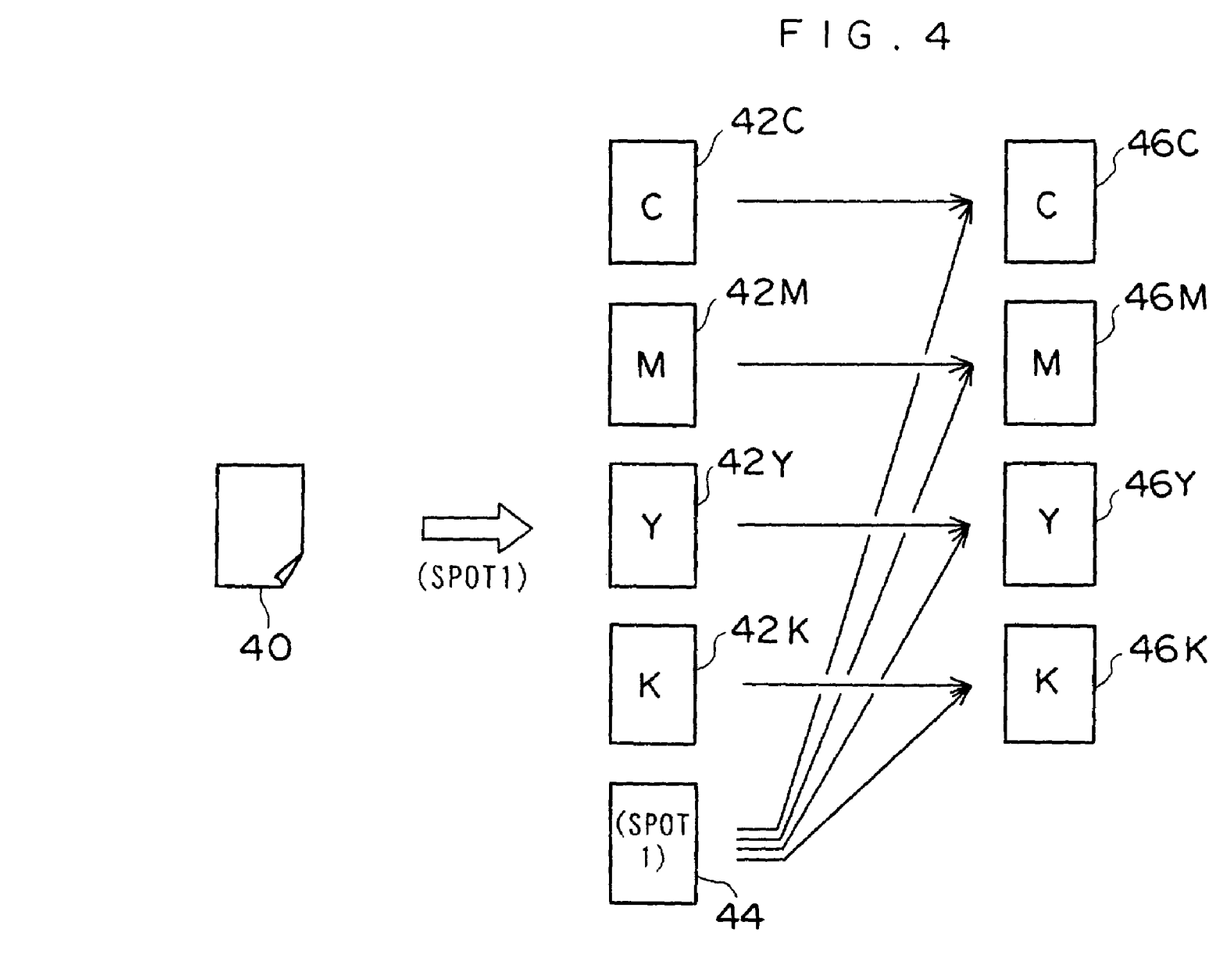
FIG. 4 is a schematic diagram showing the flow of processes according to the first embodiment.

Specifically, as shown in FIG. 4, at the time of performing a color separation process on color image data 40, if "(SPOT1)" is extracted as a spot color name, the color image data 40 is separated to the colors of C, M, Y, and K and the spot color "(SPOT1)". After that, RIP is performed on data of each of the colors separated.

After raster data 42C, 42M, 42Y, and 42K of the colors C, M, Y, and K and raster data 44 of the spot color (SPOT1) is generated, the colors of the raster data 44 of "(SPOT1)" are calculated.

After that, the raster data 44 for each colors is composed with each of the raster data 42C, 42M, 42Y, and 42K, thereby obtaining raster data 46C, 46M, 46Y, and 46K of the colors C, M, Y, and K each including the spot color.

If a table of a spot color name and CMYK values or L*a*b* corresponding to the spot color name is preliminarily stored as an LUT in a memory in the image processing component 24, it is sufficient to use the LUT to compose raster data of the spot color name with raster data of each of the colors C, M, Y, and K.

By performing the process on the spot color in such a manner, even in a page layout including an object designated in a spot color, the spot color can be accurately reproduced.

Also when an object designated in a spot color is overprinted, the color of the overprint portion can be reproduced as the same color as that of a printed matter obtained with a press plate.

Further, by performing color correction with the CMS on raster data of each of original C, M, Y, and K colors prior to composing with the raster data of the spot color, a proper color image can be reproduced.

Second Embodiment

A second embodiment of the invention will now be described. The basic configuration of the second embodiment is the same as that of the first embodiment. In the second embodiment, components similar to those of the first embodiment are designated by the same reference numerals and the description will not be repeated.

Figure 5:
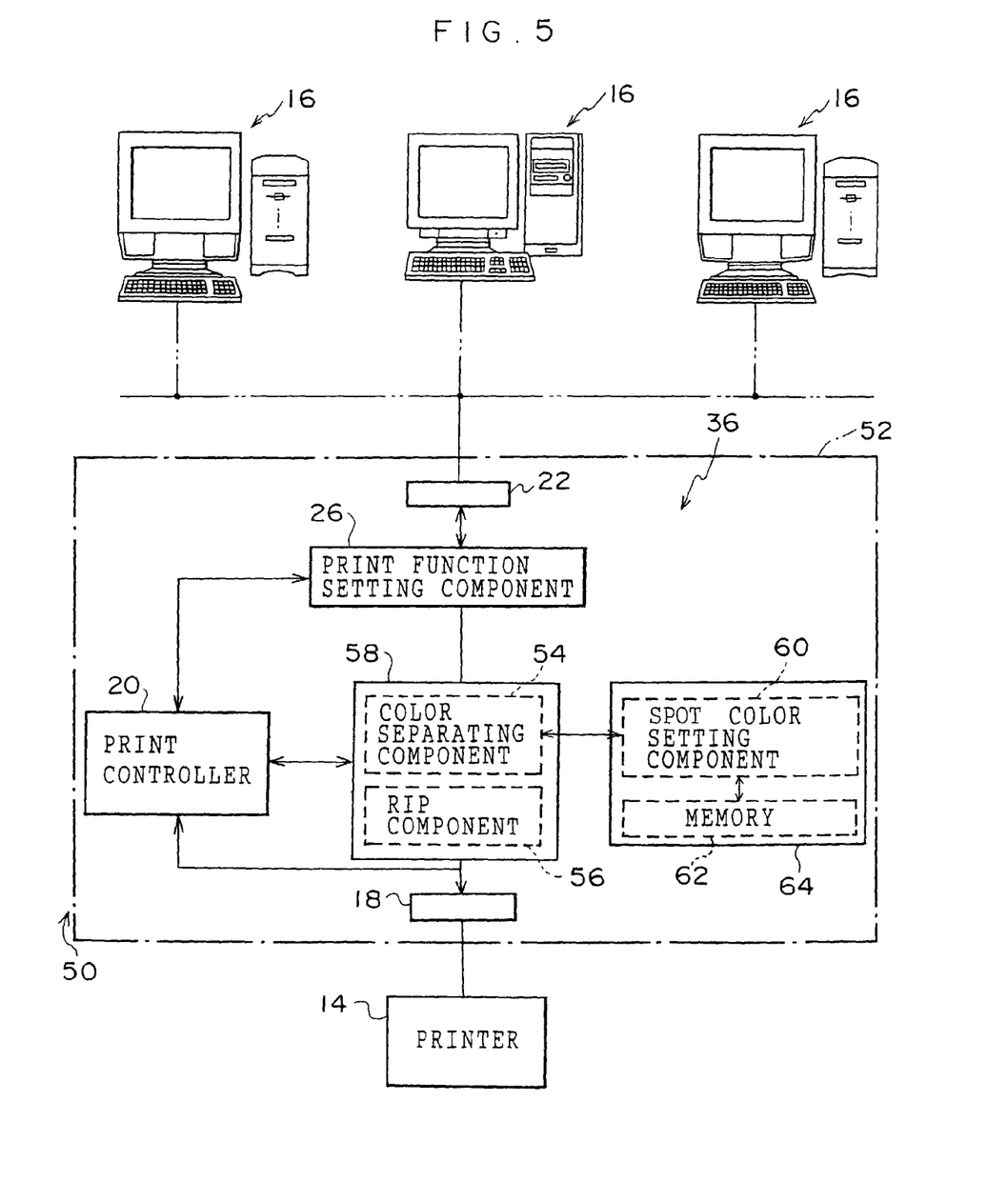
FIG. 5 is a schematic configuration diagram of a print system provided with a print server applied to a second embodiment.

FIG. 5 shows the schematic configuration of a print system 50 applied to the second embodiment. The print system 50 applied to the second embodiment has a print server 52 as an image processing apparatus. The print server 52 has an image processing component 58 formed by a color separating component 54 and an RIP component 56, and a spot color processing component 64 formed by a spot color setting component 60 and a memory 62.

In the spot color setting component 60, a spot color name is preset. The color separating component 54 performs a color separating process on a page layout. At this time, when a spot color name is extracted, the color separating component 54 performs the color separating process by using an object designated in the extracted spot color as an object designated in a temporary spot color.

In addition, the color separating component 54 outputs information indicating that the spot color name is replaced with the temporary spot color name to the spot color setting component 60, and the spot color setting component 60 stores the information into the memory 62.

Consequently, in the memory 62, a table of a comparison list for temporary spot color names and true spot color names corresponding to the temporary spot color is generated as shown in Table 2.

TABLE 2

| Temporary spot color name | Custom 1 | Custom 2 | ... | Custom E |
|---|---|---|---|---|
| Spot color name | [(SPOT 1)] | [(SPOT 2)] | ... | [(. . .)] |

The RIP component 56 generates raster data of each of the colors of C, M, Y, and K and the temporary spot color, replaces the temporary spot color name with the spot color name stored in the memory 62, obtains raster data of the original spot color name, and composes the raster data of the spot color name with the raster data of each of the colors of C, M, Y, and K with reference to an LUT of the CMYK values or L*a*b* set for the spot color name. The CMS performs color correction on the raster data of each of the colors C, M, Y, and K by referring to LUT, prior to composing.

Figure 6:
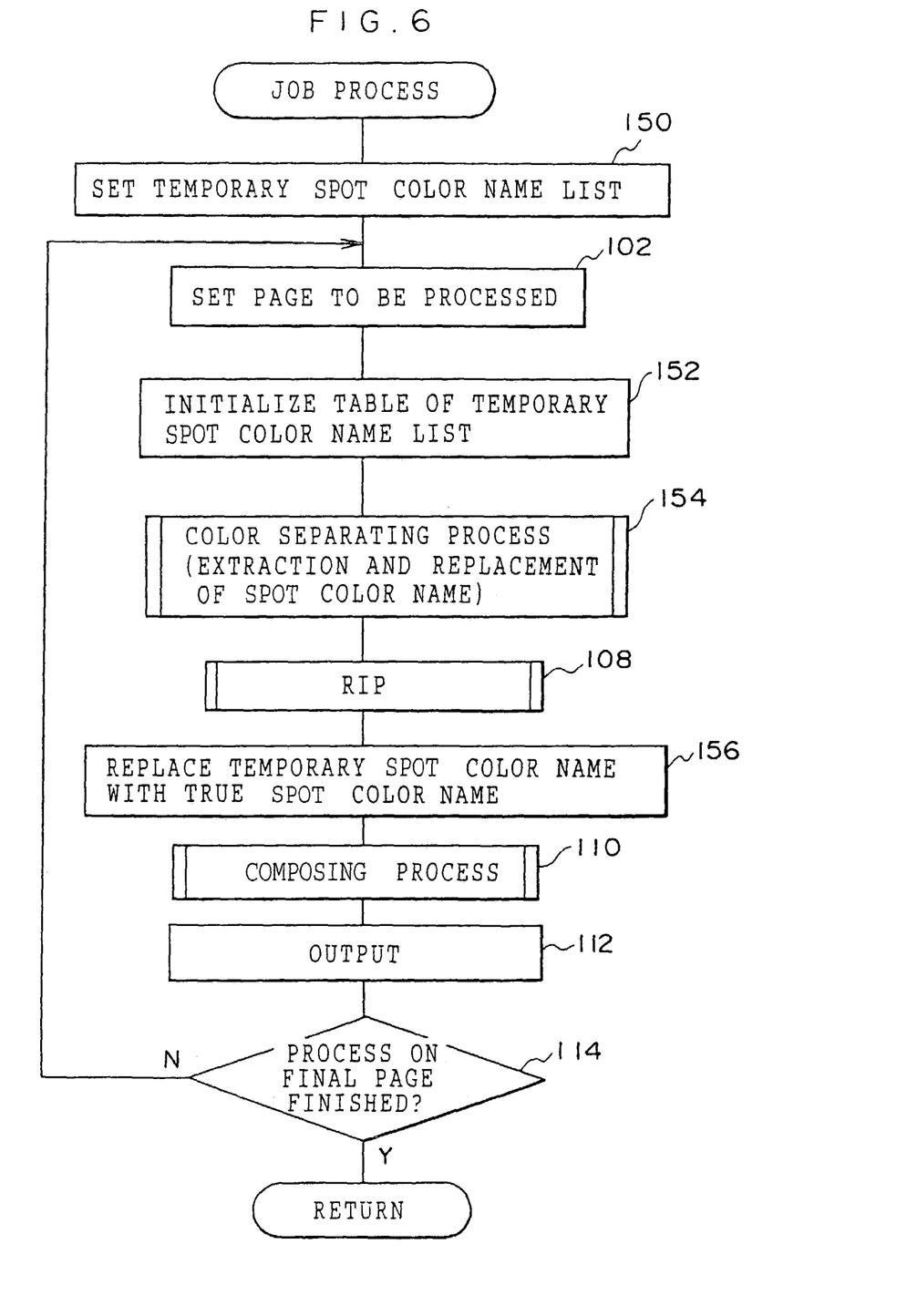
FIG. 6 is a flowchart showing an example of extraction of a spot color name according to the second embodiment.

The flow of processes in the print server 52 applied to the second embodiment will now be described with reference to FIG. 6. In the flowchart, in first step 150, a temporary spot color list is set. In step 102, page setting is made. In step 152, a table of a temporary spot color list for a set page is initialized.

After that, in step 154, while executing a color separating process, a spot color name is extracted and a command of designating the spot color name is replaced by a command of designating a temporary spot color name. Simultaneously, a table of a temporary spot color name list is updated.

In extraction of a spot color name, for example, when a command of designating a spot color such as "[0 0.16 0.17 0 (SPOT 1)] setcustomcolor" is obtained, "(SPOT 1)" is not set but "/Separation(Custom 0)/DeviceGray ( )] is set so as to generate a plate of a temporary spot color name "(Custom 0)" which was set at the start of processing. Information indicating that the spot color "(SPOT 1)" is replaced with the temporary spot color "(Custom 0)", is stored in the memory 62 (Table 2).

After finishing the color separating process, in step 108, the RIP is executed. In step 156, the temporary spot color name of raster data set as the temporary spot color is replaced with the original spot color name on the basis of the table stored in the memory 62.

With reference to the LUT of the CMYK values or L*a*b, the raster data of the replaced spot color name is composed with raster data of each of the colors of C, M, Y, and K, and the composed raster data is output to the printer 14.

Figure 7:
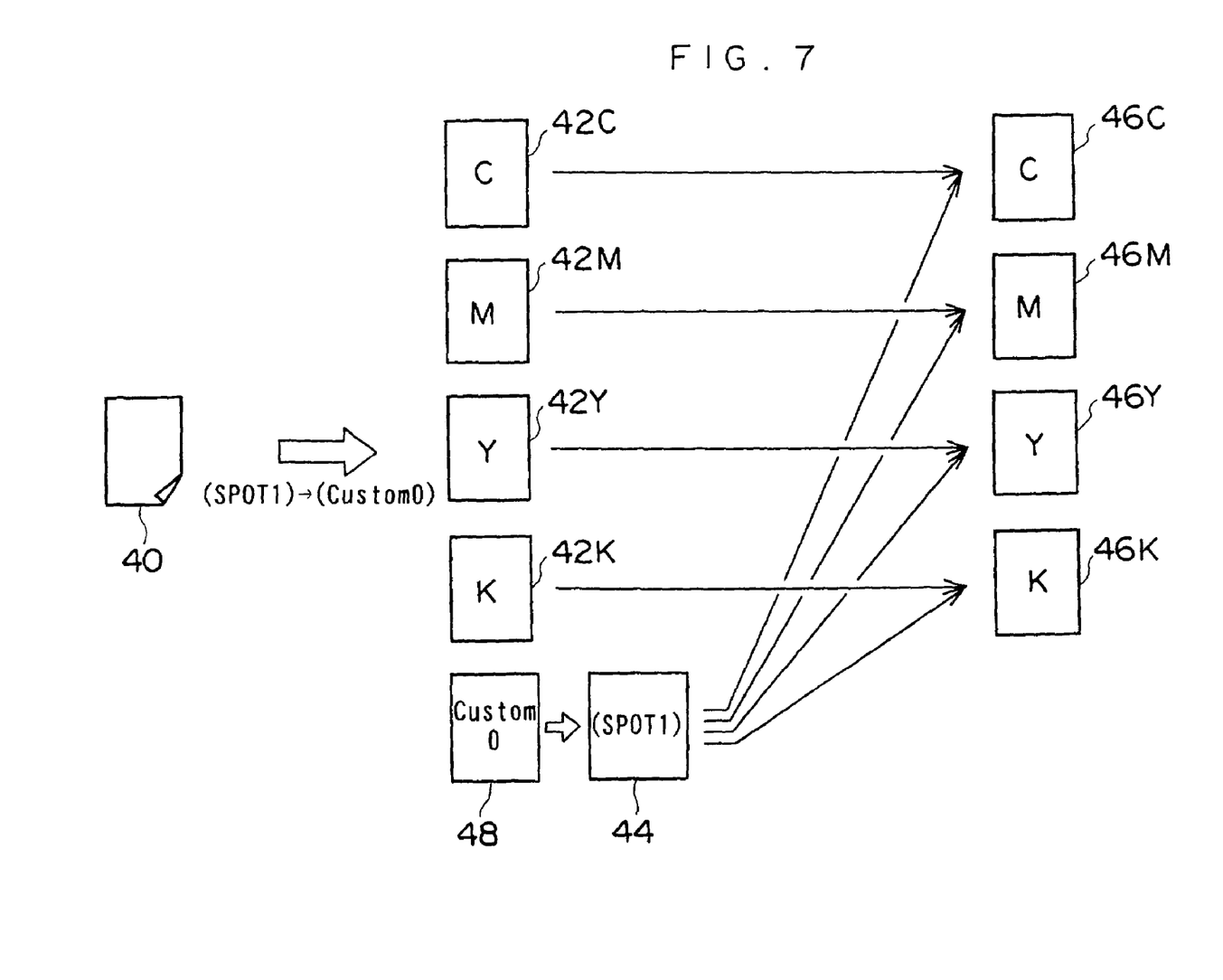
FIG. 7 is a schematic diagram showing the flow of processes according to the second embodiment.

Specifically, as shown in FIG. 7, when the color image data 40 is subjected to the color separating process, for example, "Custom0" is set as the temporary spot color. When a spot color designation is extracted, the extracted spotcolor, for example, (SPOT 1) is replaced with Custom0, and the color separating process is performed on Custom0. After that, RIP is performed on the data of each of the colors subjected to the color separating process.

In such a manner, the raster data 42C, 42M, 42Y, and 42K of the colors C, M, Y, and K and raster data 48 of "(Custom 0)" as a temporary spot color is generated, the raster data 48 of "Custom 0" is replaced with the raster data 44 of "(SPOT1)" as the designated spot color, and the color of "(SPOT1)" is calculated. After that, the raster data 44 is composed with the raster data 42C, 42M, 42Y, and 42K, thereby obtaining the raster data 46C, 46M, 46Y, and 46K of the colors C, M, Y, and K each including the spot color.

By outputting the raster data 46C, 46M, 46Y, and 46K generated as described above to the printer 14, a printout accurately reproducing the spot color is obtained.

In the print server 12 applied to the first embodiment, all of spot color names are extracted prior to the color separating process (step 100 in FIG. 2, and FIG. 3). If the code size of a print job is large, it takes time to extract the spot color name and the processing time for obtaining a print output becomes long. In contrast, the print server 52 applied to the second embodiment, performs the color separating process using preset temporary spot color names, and extracts spot color names in parallel with the color separating process. Thus, the processing time can be shortened.

Although the example of performing the color separating process and extraction of the spot color in parallel by using the temporary spot color name has been described in the second embodiment, as obviously understood by a person skilled in the art, any method of performing the color separating process each time a spot color name is extracted is possible.

In the second embodiment, the following method is also possible. One temporary spot color name (for example, (Custom0)) or two temporary spot color names (for example, (Custom0) and (Custom1)) is/are preset. When spot color names of the number larger than the preset number are extracted, a message of increasing the number of spot color plates is output to the client terminal 16. After that, the number of temporary spot color names may be increased and the color separating process is performed.

The number of temporary spot color names may be set at the time of start of the print server 52 or at the time of start of a process of a print job, or may be set in a form of using a numerical value of a predetermined function as an argument.

On the other hand, in the foregoing embodiments, the presence/absence of designation of a spot color name, a spot color, and the like are extracted from an image drawing command or image data. However, invention is not limited to this example. For example, the application provided for the client terminal 16 outputs my add a header indicative of the spot color name to the top of the image drawing command or image data, which is to be output as a print job. At the time of executing the print job, the spot color name added as the header may be extracted.

In such a manner, the presence/absence of a spot color name and a spot color name can be smoothly and promptly set, and a process on a page layout including a spot color can be performed at higher speed.

The configuration of the invention is not limited to the foregoing embodiments. For example, in the embodiment of the invention, the print server image-processes an image based on a composite output from the client terminal 16 and the printer 14 prints out the image. The invention can be also applied to an image processing apparatus of an arbitrary configuration of generating raster data of each of the colors C, M, Y, and K from a composite output of an image processing terminal such as the client terminal 16.

As described above, according to the invention, a spot color name is extracted from an image drawing command or image data, so that raster data of the spot color name can be generated. By composing the raster data of the spot color name with raster data of each of the colors C, M, Y, and K, an excellent effect such that an overprint of an object designated in a spot color can be also accurately reproduced is produced.

What is claimed is:

1. An image processing apparatus comprising:
   an extracting unit that extracts a spot color name, which is different from colors C, M, Y, and K, from at least one of the image drawing command and the image data;
   a color separated raster data generating unit that generates first, second, third and fourth raster data of each of the colors C, M, Y, and K and fifth raster data of the spot color designated by the spot color name, on the basis of at least one of the image drawing command and the image data; and
   a composing unit that composes each of the first, second, third and fourth raster data with the fifth raster data on the basis of C, M, Y, and K values of the fifth raster data, wherein the composing unit performs color correction on the first, second, third and fourth raster data before composing each of the first, second, third and fourth raster data with the fifth raster data.

2. An image processing apparatus according to claim 1, wherein the extracting unit extracts the spot color name prior to a process performed by the color separated raster data generating unit and sets the spot color name to be separated.

3. An image processing apparatus according to claim 1, further comprising:
   a setting unit for setting a temporary spot color name; and
   a storing unit for storing the spot color name extracted by the extracting unit so as to be associated with the temporary spot color name,
   wherein the color separated raster data generating unit separates the spot color name as the associated temporary spot color name, and the composing unit composes raster data, which has been separated as the associated temporary spot color name, as the fifth raster data with each of the first, second, third and fourth raster data.

4. An image processing apparatus according to claim 3, wherein the setting unit can set the number of colors to be separated by the color separated raster data generating unit, which number of colors varies according to the number of the temporary spot color names.

5. An image processing apparatus according to claim 2, wherein the C, M, Y, and K values are calculated by referring to the fifth raster data and a prestored table, and the composing unit composes each of the first, second, third and fourth raster data with the fifth raster data.

6. An image processing apparatus according to claim 1, wherein the image processing terminal includes an adding unit for adding information of the spot color name to the top of said at least one of the image drawing command and the image data, and the extracting unit extracts the spot color name added by the adding unit.

7. An image processing apparatus according to claim 1, wherein each time the spot color name is extracted by the extracting unit, the color separated raster data generating unit generates the fifth raster data.

8. A computer readable storage medium storing a computer program for executing the steps of:

extracting a spot color name, which is different from colors C, M, Y, and K, from at least one of the image drawing command and the image data;

generating first, second, third and fourth raster data of each of the colors C, M, Y, and K and fifth raster data of the spot color designated by the spot color name, on the basis of at least one of the image drawing command and the image data;

performing color correction on the first, second, third and fourth raster data; and following the performing of the color correction, composing the first, second, third and fourth raster data with the fifth raster data on the basis of C, M, Y and K values of the fifth raster data.

9. The computer readable storage medium according to claim 8, wherein in the step of extracting the spot color name, the spot color name is extracted prior to a step of generating the raster data, and a list of the names of spot colors to be separated is generated.

10. The computer readable storage medium according to claim 8, wherein in the step of generating the raster data, the fifth raster data is generated each time the spot color name is extracted in the step of extracting the spot color name.

11. The image processing apparatus according to claim 1, further comprising:

a receiving unit that receives a print job including the image drawing command and the image data through a network from an image processing terminal that is located outside of the image processing apparatus; and an output section that outputs the composed raster data composed by the composing unit to a printer where the print job is to be printed.

12. An image processing apparatus according to claim 1, wherein the composing unit performs color correction by using a look up table stored in the image processing apparatus.

* * * * *